UNITED STATES PATENT OFFICE.

CYRUS FISHER, OF LEESBURG, OHIO.

RETARDING BLOOMING OF FRUIT-TREES.

Specification forming part of Letters Patent No. 42,176, dated April 5, 1864.

*To all whom it may concern:*

Be it known that I, CYRUS FISHER, of Leesburg, Carroll county, in the State of Ohio, have invented a new and useful Process for Retarding the Bloom of Fruit-Trees; and I do hereby declare that the following is a full, clear, and exact description thereof.

In many parts of the country it happens that frost comes after a number of warm days in spring and kills the blossoms that have come out under the influence of the unseasonably warm weather. Now, the nature of my invention consists in retarding the time of blooming until there is no danger to be apprehended from the frost by the following process:

I make a frame of rough boards about four or five feet square and one foot high around the bottom of the tree and on the ground. Inside of the frame I then dig three, four, or more holes in the ground, each capable of holding from four to six gallons, according to the size of the tree. I then put a quantity of chaff or sawdust into the holes and ram it with a rammer or maul, and leave it until the ground freezes. The holes are then filled with ice or with water, which will soon freeze into ice. I then take straw, &c., and pack it tightly inside of the box about one foot in depth, and thus leave it until I wish the tree to bloom. The straw, &c., is then removed, the ice soon evaporates, and, the cold being no longer about the roots, the tree will bloom. By this process I can retard the bloom of a fruit-tree until the 20th of June, when there is no longer any danger of a return of frost.

By having a number of holes I am enabled to apply the cold directly, or nearly so, to the tap-root, thus rendering the process certain. The holes should be dug before the ground freezes. I am aware that snow and ice have been packed up against trees for a similar purpose, and know that the process is uncertain in the extreme, and therefore valueless. When the cold is applied to the body of the tree an injury is inflicted by making that part of it unnaturally cold; but when the cold is applied to the ground around the roots I merely continue its low temperature, so that it cannot furnish sufficient nourishment to enable the tree to bloom. The ice, too, by being under ground and completely inclosed, as described, keeps as long as may be needed.

Having described my invention, what I claim as new, and desire to secure by Letters Patent, is—

The process for retarding the bloom of trees, substantially as herein set forth and described.

In testimony that I claim the above I hereunto set my hand in presence of witnesses.

CYRUS FISHER.

Witnesses:
   W. H. BEATTY,
   JOHN WEST.